United States Patent [19]

Leibovich

[11] Patent Number: 4,761,602

[45] Date of Patent: Aug. 2, 1988

[54] COMPOUND SHORT-CIRCUIT INDUCTION MACHINE AND METHOD OF ITS CONTROL

[76] Inventor: Gregory Leibovich, 2218 Ardemore Dr., Fullerton, Calif. 92633

[21] Appl. No.: 884,045

[22] Filed: Jul. 10, 1986

Related U.S. Application Data

[63] Continuation-in-part of Ser. No. 693,615, Jan. 22, 1985, abandoned.

[51] Int. Cl.$^4$ .............................................. H02P 5/40
[52] U.S. Cl. ..................................... 318/816; 318/749; 318/817; 310/211; 310/180; 310/203
[58] Field of Search .............. 310/211, 183, 184, 180, 310/268, 203, 204, 205, 206, 207; 318/816, 749

[56] References Cited

U.S. PATENT DOCUMENTS

| | | | |
|---|---|---|---|
| 767,787 | 8/1904 | Whitney | 310/183 |
| 1,568,692 | 1/1926 | Pollock | 310/203 |
| 1,794,509 | 3/1931 | Beckmann | 310/211 |
| 3,191,081 | 6/1965 | Faulhaber | 310/207 |
| 3,435,315 | 3/1969 | Kordik | 318/239 |
| 3,716,734 | 2/1973 | Fam | 310/72 |
| 3,792,297 | 2/1974 | Torok | 310/211 |
| 3,940,646 | 2/1976 | Beckman | 310/166 |
| 3,973,154 | 8/1976 | Broadway et al. | 310/184 |
| 4,060,754 | 11/1977 | Kirtley, Jr. et al. | 318/768 |
| 4,338,557 | 7/1982 | Wanlass | 318/729 |
| 4,370,580 | 1/1983 | Burgbacher | 310/211 |
| 4,371,802 | 2/1983 | Morrill . | |

Primary Examiner—David Smith, Jr.
Attorney, Agent, or Firm—John G. Mesaros

[57] ABSTRACT

An induction machine having a stator carrying phase coils divided into at least two independently fed sets of coils, with a rotor or armature carrying one or more loop members, each of which is a short-circuited, continuous isolated loop conductor member having elements thereof positioned and received within the slots of the armature in a generally serpentine configuration forming at least two open loop portions, each loop portion being in a spatially related position to a corresponding coil of the stator structure, with each conductor element within a slot phasing or linking the fluxes of one stator pole. The machine may be single phase or polyphase. At least one stator phase coil of a set includes a controllable device in circuit relation therewith to enable control of one stator coil relative to the other, either in current magnitude or in current phase shift, the controllable device being either a silicon controlled rectifier or a triac. With the loop member, and by continuous control of the controllable device an approximately linear speed torque relation is obtained.

43 Claims, 5 Drawing Sheets

COMPOUND SHORT-CIRCUIT INDUCTION MACHINE AND METHOD OF ITS CONTROL

CROSS-REFERENCE TO RELATED APPLICATION

This application is a continuation in part of U.S. patent application Ser. No. 06/693,615, filed Jan. 22, 1985, of Gregory Leibovich, entitled "Compound Short-circuit Induction Machine and Method of Its Control".

BACKGROUND OF THE INVENTION

The background of the invention will be discussed in two parts.

Field of the Invention

This invention relates to induction machines, and more particularly to single phase and polyphase induction generators and motors having short-circuited rotor windings, and apparatus for the control thereof.

Description of the Prior Art

Induction machines, such as induction motors and generators have existed for many decades. Such induction machines generally are provided with stators having cores of magnetic material wound with electrical windings in an arrangement to provide a traveling magnetic field, which, through induction, operates on a rotor having suitable magnetic core material with windings thereon. Some of the rotor windings are accessible externally through slip rings and brushes for application of current through, or derivation of current from, the windings.

However, one of the most widely used induction motor is the "squirrel cage" motor, which has the stator windings energized from a multiple phase source, typically three-phase. The stator is usually an annular core of laminated steel carrying a primary winding in slots on its inner periphery. The primary winding is commonly arranged for three phase power supply with three sets of like coil groups spaced one-third of a pole-pitch apart. The application of power to the coil sets of the stator results in a superposition of three stationary, but alternating magnetic fields to produce a sinusoidally distributed magnetic field revolving in synchronism with the power supply frequency. The rotor has a magnetizable core with bar-shaped or round conductors passing axially through slots in the rotor core. The ends of the conductors are short-circuited on both ends by circular end rings of similar conductive material which are electrically coupled to the ends of the rotor's axial conductors. The rotor winding thus formed resembles a squirrel-cage, after which this type of induction motor was named.

A typical squirrel cage induction motor may have, by way of example, a 3-phase 4-pole primary winding with 36 stator and 28 rotor slots. The primary or stator winding will have 36 identical coils, each spanning 8 teeth, which is one less than the 9 teeth in one pole pitch. The winding is thus said to have an 8/9 pitch. The secondary or rotor winding consists merely of 28 identical copper or cast-aluminum conductive bars solidly connected to conducting end rings on each end. The stator windings may be connected in various configurations to provide constant horsepower, constant torque, or discretely variable torque, and may be connected to run in the forward or reverse directions.

While the squirrel cage motor has torque and speed characteristics ideally suited to a large number of applications, it has a limiting factor which has not made it universally applicable, and that limiting factor relates to the inability to economically control the speed of the motor with adequate quality of control.

The other type of polyphase induction motor is the woundrotor motor, in which the rotor includes slip ring and brush assemblies for providing external access to the rotor windings. Resistors of variable resistance may thus be placed in series with the rotor windings for effecting a measure of control of the motor's operating characteristics. Wound-rotor motors are normally started with a relatively high resistance in the rotor, and this resistance is short-circuited in one or more steps as the motor comes up to speed, thus allowing high-starting and accelerating torques, while drawing reduced current from the line.

Induction motor control has been attempted utilizing frequency control and voltage control. For frequency control, since the traveling field is a direct function of the frequency of the power source, this requires the ability to provide control over a range of frequencies, at sufficiently high power levels to control the machine. With frequency control, poor quality of control is experienced at low frequency levels, that is, below 10 Hz. Frequency control is not a very economical alternative for high horsepower induction motors. This type of control is very complex and affects the dependability of operation. The increase in cost progresses rapidly as the horsepower of the induction machine increases, often resulting in the controls costing more than several times the cost of the induction machine. While voltage to the induction machine is more readily controllable at more economical levels, such control methods drastically affect the performance characteristics, particularly, the stability of the machine, with high levels of distortion particularly when silicon controlled rectifiers are used, and low quality of control. The voltage control of induction machines has thus found favor in a limited number of applications.

In more recent years, silicon controlled rectifiers have been employed in alternating current control systems to control the form or shape of the A.C. current, and through this, the RMS value of the applied alternating current source in an attempt to regulate the speed of the motor. This method of control is referred to as phase control of motors. Such control systems for induction machines have been affected by limitations inherent in the machines, such as narrow range of control, inadequate quality of control, high levels of distortion, insufficient operating dynamics, lack of stability, and inadequate response to the driving of driven machines, resulting in excessive power consumption.

U.S. Pat. No. 4,338,557, is directed to a "Variable Speed Electric Machine Having Controlled Magnetic Flux Density", such patent issuing to Wanlass on July 6, 1982. The patent is directed to a polyphase machine having a capacitor in series with a stator winding, with a switching means connected to the main winding, the switching means operating in response to signals from an external trigger source. The switching means, capacitor and windings are fed by a source of D.C. voltage, which is converted by the series circuit and switching means into a clipped A.C. square wave across the main winding, with frequency variation of the square wave being obtained by varying the frequency of the signal from the external trigger source.

Another method of speed control of an induction machine is shown and described in U.S. Pat. No. 3,435,315, issued Mar. 15, 1969 for "Apparatus for Control of Adjustable Speed A.C. Motors."

With single phase induction machines, the problem is more complex. Some means must be provided to effect the starting movement of the rotor, that is to effect a starting torque. Therefore, auxiliary means must be provided for starting. Such means have taken the form of split-phase arrangements, such as the use of a capacitor to provide a phase differential between different groups or sets of windings of the motor to provide a starting torque. Centrifugal mechanisms have been employed in such motors to remove the auxiliary means from the circuit after the rotor reaches a certain speed. Specially configured poles have been used, such as shaded poles having a short-circuited winding displaced electrically at some angle from the main winding. With such auxiliary means, energy is dissipated in the auxiliary means, thus increasing the amount of energy required for operation of the motor.

Control of single phase induction machines are exemplified in U.S. Pat. No. 3,940,646, issued to Beckman on Feb. 24, 1976 for a "Single-Phase Induction Motor", and U.S. Pat. No. 4,371,802, issued to Morrill on Feb. 1, 1983 for a "Half-Pitch Capacitor Induction Motor".

U.S. Pat. No. 3,716,734, issued to Fam on Feb. 13, 1973, for a "Parametric Motor", discloses an attempt to provide a single-phase alternating current motor that operates as a balanced two-phase motor from a single-phase power supply by providing first and second orthogonally disposed iron core magnetic stator paths, one of which is connected to a single phase power source, and the other of which has a winding thereabout coupled in closed series loop with a capacitor, the second path providing a phase shift through the winding and capacitor by parametrically induced excitation. Such a motor requires an extraordinary stator structure, which departs from conventional motor/generator manufacturing techniques.

In general, direct current motors are used in a variety of applications where high quality speed control is desired. However, such motors have brushes and commutators for enabling application of energy to the rotor windings. Such brush and commutator arrangements, in addition to emitting spurious signals which interfere with radios and the like, require constant repair and replacement. Furthermore, for a given horsepower rating, a D.C. motor tends to be much larger than and A.C. motor.

The present invention has, as an object, the providing of a new an improved readily controllable induction machine.

SUMMARY OF THE INVENTION

In accordance with an aspect of the invention, an induction machine is provided with a stator formed of an annular core of laminated steel carrying at least two sets of windings in slots on its inner periphery. The stator windings may be arranged for three phase power supply with three sets of like coil groups spaced a given one-third pole-pitch apart. The stator windings are divided into at least two independently fed sets of inductively uncoupled multiple windings. These inductively uncoupled sets are formed by phase coils concentrated around consequent poles of similar polarity. The secondary poles, that is, the poles of opposite polarity, carry no coils. The rotor means, or armature is formed as a core of laminated steel or the like, having a plurality of slots disposed in a direction generally transverse to the intended direction of relative movement between the stator and armature. The armature winding includes a plurality of individual, angularly displaced windings, each of which is a short-circuited, continuous isolated loop conductor member having elements thereof positioned and received within the slots to form a generally serpentine configuration forming a plurality of loop portions, each loop portion being in a spatially related position to a corresponding pole of the stator structure, with each conductor element within a slot phasing or linking the fluxes of one stator pole.

For machines having more than two poles, each loop member has the loop portions thereof positioned in a given slot set of the rotor or armature, with each slot set successively shifted relative to the next along the air gap between the stator and armature. Each slot may carry loop elements of more than one array. The loop consists of conductors connected and axially disposed in such a way that every adjacent axial conductor element faces a pole of opposite polarity. Consequently, the loop conductor elements link fluxes of stator poles carrying coils of different sets, and link fluxes from the secondary poles. The loop member compounds, or integrates, the electromotive forces induced in its individual conductor elements in a magnitude determined by the instant flux density and polarity of the stator pole associated with the particular loop portion. The current flowing in the loop member is restricted by its resultant e.m.f. and impedance. The correlation of the flux density, phase and magnitude at the poles are within certain boundary conditions. By selectively controlling the phase shift, or the phase of the current in one group of stator windings relative to another, the machine may be readily controlled. Smooth control of the machine may be effected by the use of silicon controlled rectifiers connected in the phases of one set of the plurality of stator windings or in the common of the connection of the sets of stator windings. The firing angle of the SCR's may be selectively controlled to effect the relative shift of the phase, phase and magnitude or magnitude of the currents of the set of stator windings controlled through such SCR's.

Other features and advantages will be better understood from a reading of the specification, when taken in conjunction with the accompanying drawings, in which like reference numerals refer to like elements in the several views.

DESCRIPTION OF THE PREFERRED EMBODIMENT

In accordance with the present invention, there is shown and described an induction machine having a compound short-circuit rotor winding in the form of a loop member having open loop portions, the machine being controllable through diversified methods of control, such as control of the relative phase, phase and magnitude, and magnitude shift of the currents within the stator windings. As will become obvious, the induction machine of the present invention results in a machine which combines the best of the simplicity and dependability of the squirrel cage induction machine, with the facility of control characteristics of the wound rotor induction machine, with a reduction in the limitations of either machine, with improvement in the susceptibility to control, and adaptability to variable loading.

In accordance with the present invention, control is simplified, at a lower cost, with less power consumption and level of distortions, accompanied by a wider machine range of performance characteristics. The induction motor, according to the invention, provides for an adjustable speed drive especially suitable for phase control, with the induction generator according to the invention providing for variable speed with adjustable torque through phase shift control.

Furthermore, in accordance with the present invention, there is provided a new and improved induction machine wherein the transfer of electromagnetic energy to the rotor winding is governed through partial control of the power delivered to the stator, with total energy received by the rotor winding, less losses, being converted to mechanical work, with the structure thereof allowing the withdrawal of a variable part of rotor core energy, for return to the network.

Figures 1, 2, 3, 4:
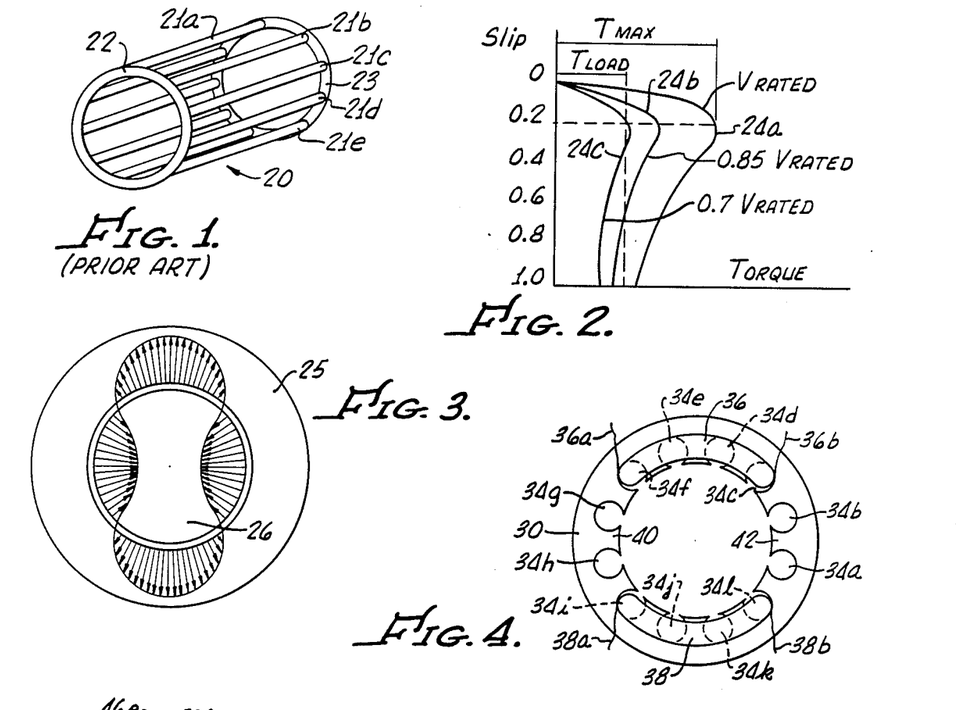
FIG. 1 is a perspective view of the rotor winding of a prior art squirrel cage motor.
FIG. 2 is a graphical depiction of the speed or slip versus torque characteristics of a prior art four pole squirrel cage motor.
FIG. 3 is a diagrammatic representation of the flux paths of the prior art four pole squirrel cage motor.
FIG. 4 is an end view of a four pole structure stator of an induction machine according to the invention with one coil per phase carried by consequent poles.

FIG. 1 shows a rotor winding, generally designated 20, of a prior art squirrel cage induction machine. Such rotor windings are well known in the art, and include a plurality of conductor elements 21a, 21b, etc., which are symmetrically arranged and received in slots of a laminated steel rotor structure (not shown), with the ends of the conductor elements electrically connected, such as by end rings 22, 23. The conductor elements 21a, 21b, etc. may be bars of copper or aluminum or an alloy capable of conducting the amount of current for the respective size of motor, with the end rings 22, 23 being formed of the same material. The end rings 22, 23 may be welded or brazed to the ends of the conductor elements 21a, 21b, etc. Alternatively, the entire short-circuited rotor winding 20 may be formed as a unit of cast material. With such squirrel cage rotor windings, every pole of the stator sees a closed loop on the rotor.

FIG. 2 depicts a graph of the operating characteristics of a prior art polyphase four pole induction motor, the graph being specifically slip versus torque, for varying voltages. It is to be emphasized that slip is inversely proportional to speed, that is, zero slip corresponds to synchronous speed of the motor. Thus the curves illustrated are also speed/torque curves. Curve 24a depicts slip versus torque at rated or maximum voltage, curve 24b depicts slip versus torque at 85% of rated voltage, while curve 24c depicts slip versus torque at 70% of rated voltage. As can be seen, with voltage control of polyphase machines, the torque drops substantially with reduced voltage, thus limiting the use of voltage control of polyphase induction machines to certain applications which can tolerate such characteristics with very limited range of speed control.

FIG. 3 depicts the symmetrical flux distribution of a four pole squirrel cage induction motor, where the outer band designated 25 represents the stator and the inner circle represents the rotor 26. The rotor 26 includes the squirrel cage rotor winding depicted in FIG. 1. With such a motor, the number of poles induced in the rotor is the same as the number of poles on the stator. That is, with a rotor 26 having the symmetrical winding 20 of FIG. 1, when positioned in a four pole stator, will have induced therein four poles. Similarly, when positioned in a six pole stator, six poles will be induced in the rotor 26. With the four pole configuration of FIG. 3, the direction of the arrows and the length of the arrows depict the direction and magnitude of flux, respectively. In the horizontal direction, as viewed in FIG. 3, the flux path is from the stator 25 to the rotor 26. Similarly, in the vertical direction, the flux path is from the rotor 26 to the stator 25. The directions and magnitudes of the fluxes are thus equal and opposite, and the flux distributions is symmetrical.

In accordance with the instant invention, as shown in FIG. 4, there is shown a cylindrical stator, generally designated 30, of a four pole machine. The stator 30 is formed in a conventional manner of an annular laminated steel core 32 having a plurality of axially extending slots 34(a) through 34(l) (twelve in all corresponding to four poles of three phases), with the core therebetween defining radially extending teeth. Two diametrically opposed sets of stator phase coils or windings 36 and 38 are received within some of the slots of the stator 30. The stator coils 36 and 38 are conventionally configured of a large number of turns of a conductive material, such as copper wire, formed in a generally rectangular configuration, and inserted, or wound in, slots spaced a certain distance apart. As shown in FIG. 4, the opposing axially extending sides of coil 36 are positioned or contained in slots 34c and 34f, with two intervening unoccupied slots 34d and 34e, with the coil ends 36a and 36b extending out from the stator 30 for connection to an external source of power. Similarly, coil 38 has the opposing sides thereof received in slots 34i and 34l, with two intervening unoccupied slots 34j and 34k, with the coil ends 38a and 38b extending out from the stator 30 for connection to an external source of power.

The stator coils 36 and 38 thus form two consequent poles of the four pole stator 30, with the other two poles of the motor carrying no coils or windings and being at locations angularly displaced from the first two poles by ninety degrees. That is, the other two poles have the centers thereof designated 40 and 42, which will be at the midpoints of the two intervening slots, with pole 40 at the midpoint of slots 34a and 34b, and pole 42 at the midpoint of slots 34g and 34h. The stator coils 36 and 38 are thus divided into parts of two independently fed sets of multiple windings. These inductively uncoupled sets are formed by phase coils concentrated around the consequent poles of similar polarity. The secondary poles 40 and 42, that is, poles of opposite polarity, carry no coils.

The stator 30 shown in FIG. 4 thus has a four pole structure. It is to be understood that for a three phase stator structure, with twelve slots, there will be three phase coils of windings per set. For clarity, only one phase set is shown. By way of example, although not shown, for a three phase motor, a second phase of windings would have a first coil which would span and be contained within slots 34d and 34g with the opposing coil of the phase contained in slots 34j and 34a. The third pair of windings would have one phase coil spanning and received in slots 34e and 34h, with the opposing phase coil in slots 34k and 34b. Thus with a three phase motor, each of the twelve slots would contain one side of a coil winding of one of the three phases of both sets of windings.

The poles of opposite polarity, that is the secondary poles 40 and 42, carry no coils. When the currents of stator coils 36 and 38 are "in phase" and have equal magnitude, the magnetic field of the machine has a symmetrical pattern and the secondary poles receive a maximum flux from the consequent poles.

Figure 5:
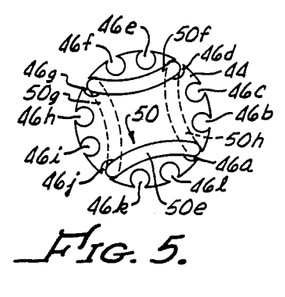
FIG. 5 is an end view of a rotor for use with the stator of FIG. 4 in an induction machine according to the invention with one compound short-circuit loop member in its slots.
Figure 7:
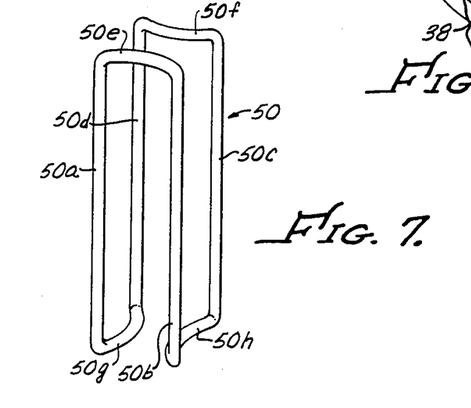
FIG. 7 is a perspective view of the continuous short-circuit loop member of the rotor of FIG. 5.

FIG. 5 shows a rotor core, which is a conventional rotor core 44, that is, it is formed of laminated steel with a plurality of axially extending equiangularly disposed slots 46 (twelve being shown) about the periphery thereof, with the core therebetween defining radially extending teeth. However, in accordance with the invention, a short-circuited winding in the form of a continuous compound short-circuited loop member 50 is accommodated in the rotor slots, with only one loop member 50 being shown for ease of illustration (See also FIG. 7). The loop is formed of four conductor elements 50a, 50b, 50c and 50d, which are positioned in slots 46a, 46d, 46g and 46j, respectively, with the opposing ends thereof being connected by end elements 50e, 50f, 50g and 50h to form one continuous compound loop member 50. Each of the elements is connected in series and disposed in such a way that every adjacent conductor element faces a pole of opposite polarity. Referring also to FIG. 7, the loop member 50 has first and second open-loop portions, one portion including conductor elements 50a and 50b along with the interconnecting end element 50e lying in the same plane at the bight portion thereof. The other loop portion includes conductor elements 50c and 50d along with interconnecting end element 50f lying in the same plane at the bight portion thereof. Thus, one set of two end elements couples the ends of a pair of conductor elements at that end into two separate conductive paths, while the other set of two end elements at the opposite end of the rotor couples the other ends of the conductor elements in a direction mutually perpendicular to the first set of coupling end elements to form a continuous short-circuited loop. In contrast to the closed loop seen by the poles in the prior art squirrel cage motor, in accordance with the induction machine of the present invention, the stator poles see these open loop portions.

Figure 6:
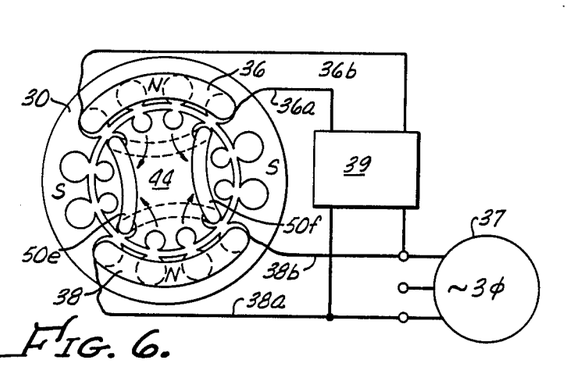
FIG. 6 is an end view of the rotor of FIG. 5 installed relation to the stator of FIG. 4 in accordance with the invention.

Referring now to FIG. 6, the rotor 44 is shown in assembled relation within the stator 30, and the loop conductor elements are shown between poles. As can be seen in end elevation, the loop 50 is symmetrical, and with the four pole induction machine configuration hereinabove described, the open loop portions replicate the stator pole structure, that is, as depicted in FIG. 6, the width of the loop 50 spans the distance between the axial ends of the stator windings 36 and 38. With the vertical poles being "north" poles, indicated by the letters "N", and the non-coil carrying poles being "south" poles, as indicated by the letters "S", the flux paths are shown by the arrows, that is, from the north poles to the south poles, thus linking the conductor elements within the flux path. As shown, the two sets of coils 36 and 38 are for one phase, with power being provided by a three-phase source 37. One set of coils 38 is connected directly to the source 37, with the other set of coils 36 being connected through a suitable controller 39, which may vary either the relative phase shift of the currents in the two coils, or the phase and magnitude of the current in one coil relative to the other, or the magnitude of the current in one coil relative to the other. In this manner, the transfer of electromagnetic energy to the rotor winding loop member 50 is governed through partial control of the power delivered to the stator, with total energy received by the rotor winding, less losses, being converted to mechanical work, with the structure thereof allowing the withdrawal of a variable part of rotor core energy, for return to the network.

Each loop member 50 is positioned in a slot set of the rotor 44 which is successively shifted relative to the next slot set along the air gap between the stator 30 and rotor 44. Each slot may carry loop elements of more than one array. With the loop members 50 connected and disposed in such a way that every axial conductor element of the loop member 50 faces a pole of opposite polarity, the loop conductor elements 50a–50d will link fluxes of poles magnetized by or exited by coils of different sets.

The loop member 50 compounds, or integrates, the individual electromotive forces induced in its conductor elements 50a–50d in a magnitude determined by the instant flux density and polarity of the poles associated with each of the conductor elements 50a-50d in the loop member 50. The current flowing in the loop member 50 is restricted by its resultant e.m.f. and impedance. By selective control of the energy to the stator windings, the total amount of rotor core electromagnetic energy in the machine is a variable ratio of the energy converted to work, the energy accepted by the rotor winding, and rejected by it, or the energy recovered back to the stator coils and network.

The control of the energy distribution is achieved by the following means. In the instance when both sets of stator coils 36 and 38 have currents which are in phase and of equal magnitude, the consequent poles of the stator 30, that is the poles defined by the coils 36 and 38, are inductively uncoupled and establish their magnetic fluxes through the secondary, or non-coil carrying poles 40 and 42. The loop member 50 e.m.f., current and rotor speed are maximum for a given torque. In this instance, the reluctance of magnetic circuit has its highest value. The magnetic energy recovered to the stator coils reaches its lowest level. The machine performs in accordance with the basic operating characteristics similar to a conventional induction machine, with the flux distribution substantially similar to that shown in FIG. 3.

Figure 8:
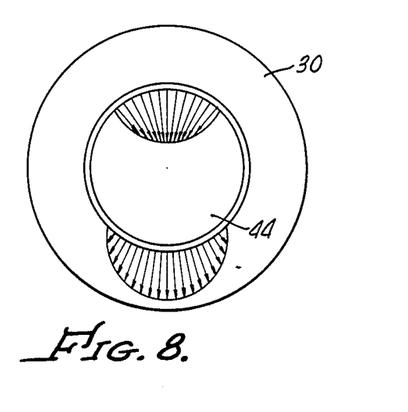
FIG. 8 is a diagrammatic representation of the stator flux paths of the four pole induction machine of FIG. 6 with one group of stator windings energized at one hundred eighty degree phase shift relative to the other.

On the opposite extreme, conditions take place when both sets of stator coils 36 and 38 have equal currents which are shifted in phase relation by 180 degrees. The flux distribution in this instance is shown in FIG. 8. In this situation, the consequent poles, that is the poles defined by the coils 36 and 38, are inductively coupled and have the largest mutual inductance. At the secondary, or non-coil carrying poles 40 and 42, the resultant fluxes are zero. The e.m.f. induced in the rotor conductor elements 50a-50d facing the consequent poles are similar in polarity and tend to neutralize each other. The resultant e.m.f. and current of the rotor loop member 50 is zero, that is, it is equivalent to an open circuit condition of the rotor loop member 50. The reluctance of the magnetic circuits established through the rotor core 44 is at a minimum and the magnetic energy recovered by or exchanged between the stator coils 36 and 38 is at its highest value.

Figure 9:
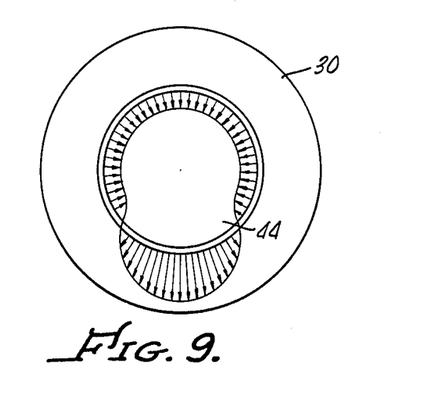
FIG. 9 is a diagrammatic representation of the stator flux paths of the four pole induction machine of FIG. 6 with only one group of stator windings energized.

In one instance, if gating devices or controllable semiconductor devices, such as silicon controlled rectifiers are used in the controller 39 to control the stator coil 36, there is an extreme condition which occurs when the SCR's included in the stator coil 36 are not conducting. In this case, the e.m.f. induced in a loop portion of the loop member 50 is at a maximum when a stator pole carrying an energized coil is adjacent to a loop portion of the rotor loop member. The e.m.f. of a loop portion of loop member 50 adjacent a secondary pole 40, 42 is reduced to one third of its nominal value due to the flux redistribution and the flux density drop in the air gap of the secondary poles. The e.m.f. in a loop portion of loop member 50 adjacent a deenergized stator pole is equal to the e.m.f. in a loop portion of loop member 50 adjacent a secondary pole, but its polarity is reversed relative to the symmetrical magnetic flux pattern. The stator flux distribution in this situation is illustrated in FIG. 9. Therefore, the resultant loop member 50 e.m.f. and current is far below (more than three times) the value in the machine than would be the case with both coils 36 and 38 energized, causing the slip to increase to maintain loop current. The underloaded machine runs at the same speed, partially returning energy to the stator coils due to the low reluctance magnetic circuit through the deenergized pole and the total machine flux redistribution.

Consequently, the value of the recovered and converted components of total magnetic energy carried by the established magnetic field are affected by its pattern and determined via the relative phase and magnitude of the independently controlled magnetic fluxes through the rotor core 44 and its winding loop members 50. The shift of the relative phase, phase and magnitude, or magnitude of the currents in one set of stator windings redistributes the magnetic fluxes through the rotor 44 and stator 30 cores, thereby diverting their energy from the rotor winding back to the stator coils. The magnetic energy redistribution results in a variation of the machine performance characteristics and parameters.

Inasmuch as the foregoing adjustments cause predictable shift of the current phase of the rotor 44 relative to the currents of the stator 30, the control of this particular parameter makes it possible to conduct shockless loading and stabilization of the machine in a generator mode. A gradual shift of the relative phase and magnitude of the current in the stator windings from an "off phase" relation toward an "in phase" relationship provides adjustments of rotor current magnitude and phase angle, and thereby the generator torque under the variable speed of the prime mover. By selectively controlling the phase shift of the relative phase of the stator current and magnitude, the machine may thus be readily controlled to maintain maximum power output under system disturbances.

Figure 10:
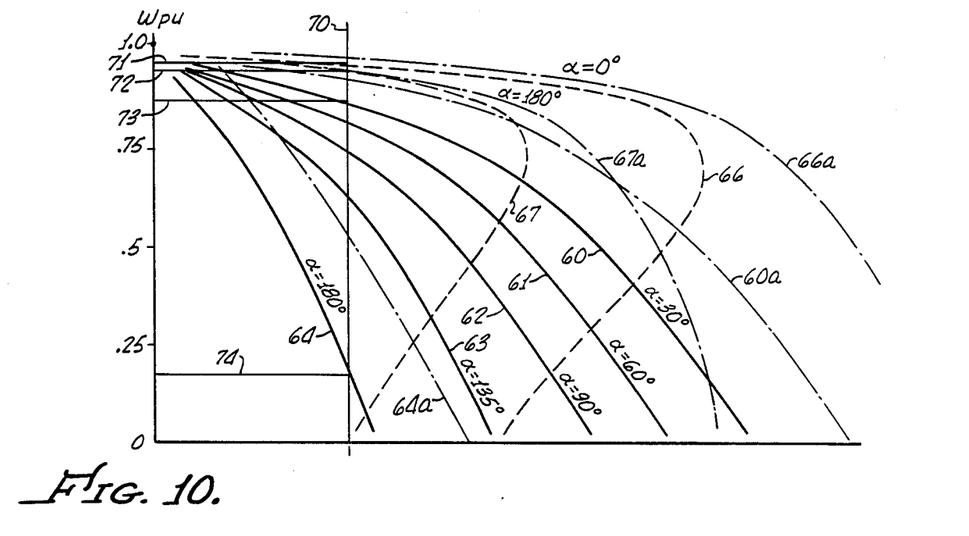
FIG. 10 is a graphical depiction of a family of curves showing torque versus speed for a motor constructed in accordance with the present invention shown in solid lines contrasted with the same curve for the same stator having a squirrel cage rotor shown in dotted lines, with current versus speed characteristics for both rotors depicted in broken lines.

Referring now to FIG. 10, there is shown a graph having a plurality of curves, with the vertical scale representing speed and the horizontal scale representing torque, as well as current, on a "per unit" basis. The solid line curves 60-64 represent the speed/torque relationship of an induction motor constructed in accordance with the present invention operating under phase control. The dashed line curves 66 and 67 represent the speed/torque relationship of an induction motor having the same stator as the motor of the curves 60-64, with the rotor replaced by a standard squirrel cage motor, again operating under phase control. In both cases, the motor has controllable semiconductor devices, such as SCR's in the stator winding circuits controlled for firing through different angles to control the relative phase and magnitude of the currents in the stator coils. The firing angle is indicated adjacent each curve with the Greek letter "alpha".

The purpose of these curves is to illustrate the fundamental difference in motor operating characteristics when the same stator is controlled in the same way with a "closed loop" squirrel cage rotor winding of the prior art, and with a continuous short-circuited loop member rotor windings with "open loop" portions interacting with the thus controlled field of the stator windings. While FIG. 2 depicts the speed torque characteristics of the squirrel cage motor with conventional voltage control wherein all phases are simultaneously controlled, the dotted line curves in FIG. 10 depict a squirrel cage rotor in the stator 30 wound in accordance with the present invention, that is, with one of the two coils in each phase independently fed to vary the currents phase and/or magnitude as hereinabove described. In this manner, it can be seen that the differences in the operating characteristics are not due simply to the manner of control of the stator windings, but are due to fundamental flux interactions between the thus-controlled stator coils 36, 38 and the loop member 50 of the present invention.

Curve 66 effectively represents the speed/torque curve of the motor with the squirrel cage rotor at a firing angle of 0 degrees, while curve 67 represents the speed/torque curve of the motor with the squirrel cage rotor at a firing angle of 180 degrees. Curve 66a shows the speed/current relationship of the motor with the squirrel cage rotor operating at 0 degrees firing angle, with curve 67a showing the speed/current relationship at 180 degrees.

Similarly, curves 60-64 for the motor of the present invention represent the speed/torque curve at firing angles of 30 degrees, 60 degrees, 90 degrees, 135 degrees and 180 degrees, respectively. Curves 60a and 64a show the speed/current relationship for the motor at firing angles of 30 degrees and 180 degrees, respectively.

Thus, the broken line curves 66a and 67a are curves of the current relationships for the correspondingly numbered speed/torque curve of the motor with the squirrel cage rotor, while the broken line curves 60a and 64a are curves of the current relationships for the correspondingly numbered speed/torque curve of the motor with the compound loop members 50 of the present invention.

For purposes of explanation, a vertical line 70 has been drawn through a "per unit" torque equal to "1". Horizontal lines 71-74 have been drawn from the intersections of curves 66, 67, 60 and 64 with line 70. In general the "range of operation" of an induction motor operating under phase control is the range of speed which may be obtained at a given or constant torque. The vertical line 70 has been drawn as a constant torque line. It can be seen from the vertical, or speed scale, that the speed range of the squirrel cage induction motor, for phase control through angles from 0 degrees to 180 degrees, lies between horizontal lines 71 and 72, for a speed control range of about 2 percent of the total speed range.

On the other hand with the motor of the present invention, for firing angles between 0 degrees and 180 degrees, with 30 degrees to 180 degrees being shown, the range of operation lies between horizontal lines 73 and 74, which is approximately 70% of the total speed range at that torque. Although the 0 degree curve is not shown, it is to be noted that this curve lies very close to the 30 degrees curve, and therefore has not been depicted. Furthermore, with the squirrel cage machine, optimum speed which produces maximum torque lies at about 80% of synchronous speed, which is at about the knee of curves 66 and 67. The current curves 66a and 67a virtually track the speed curves up to that point, with current increasing thereafter as speed slows down.

In contrast, by use of the rotor loop members 50 of the present invention, with appropriate control of the stator winding, such as coils 36, 38, the speed/torque curves 60-64 are comparatively linear for all firing angles, and show predictable controllable, relations, which enable speed control of the induction machine with substantial overall stability, and excellent control at very low speed levels heretofore economically unobtainable with squirrel cage motors. Furthermore, as can be seen by the current curves 60a and 64a corresponding to the speed curves 60 and 64, the current relationship tracks very closely without excess current requirements at any part of the curves, thus providing economy inherent in the machine.

Figure 11:
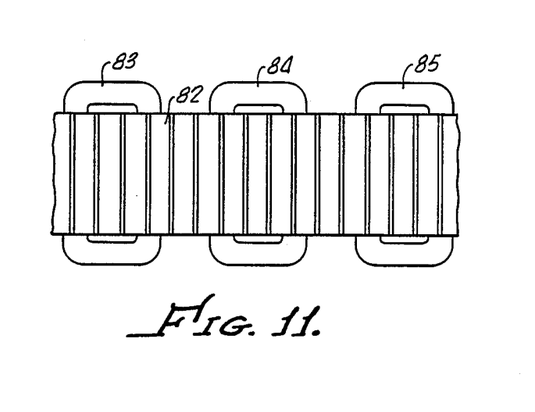
FIG. 11 is a plan view of a linear motor stator core of an alternate embodiment of the invention with single phase coils carried by consequent poles.

FIG. 11 depicts an alternate arrangement utilizing the aspects of the present invention in a linear induction machine. A partial depiction of the stator of a linear type induction motor is shown in FIG. 11. The stator core 82 has consequent poles which carry coils of similar phases belonging to the different sets of stator windings. The coils 83 and 85 are the two coils of the same phase of the first set of windings and coil 84 is the same phase of a second set of windings of the independently fed polyphase system.

Figure 12:
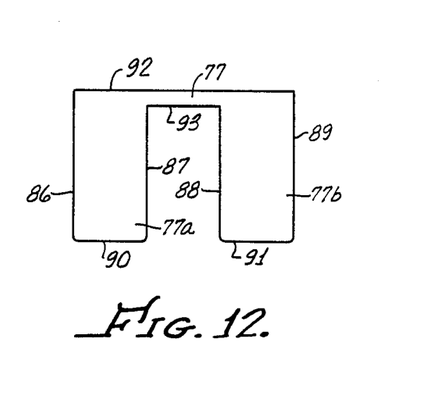
FIG. 12 is a simplified diagram of an armature short-circuit compound loop member for use with the stator core of FIG. 11.

The linear motor armature short-circuit winding compound loop member, generally designated 77, is shown in FIG. 12. It consists of conductor elements 86, 87, 88, 89 connected in series by conductive end members or links 90, 91, 92, and 93. As can be seen, two open loop portions of the member 77 are formed, one open loop portion, designated 77a, being defined by conductor elements 86 and 87 along with the interconnecting link 90, with the other open loop portion, designated 77b, being defined by conductor elements 88 and 89 along with its associated interconnecting link 91. Each open loop portion thus formed is dimensioned so that there is spatial alignment to the pole structure, that is, with loop portion 77a in spaced aligned proximity with coil 83 of one set of windings, open loop portion 77b is in spaced aligned relation with the pole defined by coil 84, which is the phase coil of the second set of windings. Thus, the structure of the loop member 77 replicates the configuration of stator consequent poles and their mutual arrangement. The resultant e.m.f. in the loop member 77 is the sum of the e.m.f.'s in the individual conductor elements 86-89 forming it and, at any instant, depends on the relative phase, phase and magnitude or magnitude of the current in the stator coils of different sets of windings. As in the previous embodiment, by selective control of the currents of like coils of different sets of coils relative to the other like coils of the the different sets, in phase, relative phase and/or magnitude, the characteristics of the linear induction motor may be smoothly varied.

The smooth control of the induction machine according to the invention may conveniently be effected by controllable linear or non-linear devices, such as silicon controlled rectifiers and triacs, which can be connected in circuit relation with the phases of one set of the plurality of stator windings or in the common connection of the various sets of connections. The firing angle of the SCR's or triacs may be selectively controlled through continuously variable controlled increments to affect either the relative shift of the phase, or the phase and magnitude or the magnitude of the current of the set of stator windings controlled through such SCR's. Although prior art control systems have utilized controllable devices, such as SCR's or triacs, in polyphase induction machines, such devices have been utilized as on-off switches to reconfigure, or concatenate the winding connections with two sets of windings for discrete control, or for continuous phase control of all windings at the same time, and have not been used to provide continuous control as shown and described herein.

The maximum offset of these parameters, (i.e., the relative shift of the phase, or the phase and magnitude or the magnitude of the current of the set of stator windings controlled through such SCR's) adequate to maintain stability at the lower speeds of the machine characteristics, takes place when the SCR's or triacs are in a non-conductive state, and this state may be limited or controlled by selective arrangement of winding set connections. This may be accomplished by suitable connection of the SCR's or triacs in circuit relation with the winding sets, alone, or along with capacitive components of predetermined values in circuit relation with the winding sets, or alternatively by both methods, with the values of the capacitive components being selected in accordance with the machine parameters. In this manner, as the firing angles of the SCR's or triacs approach zero, both sets of winding may be selectively connected in a similar way to carry equal synchronized currents, thereby causing the machine to perform in accordance with its basic characteristic.

Figure 13:
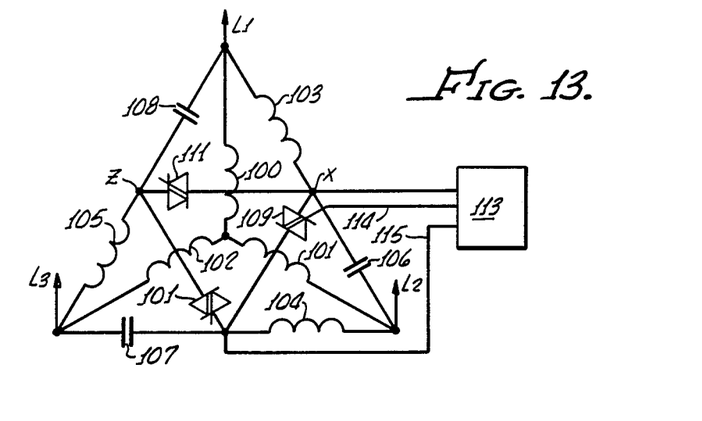
FIG. 13 is a schematic diagram showing a stator winding in accordance with the present invention having a polyphase winding interconnected with gating devices in the winding circuit to smoothly effect control of the operating characteristics.

FIG. 13 shows a schematic diagram of one method of connection of the stator winding sets in a three phase motor for providing a smooth phase shift and control of the magnitude of currents. The phases of the first set of stator windings 100, 101 and 102 are connected in a wye configuration connected to the lines L1, L2, and L3 of the power supply. The phases of the second set of stator windings 103, 104 and 105 are connected to form a delta configuration when connected to the power lines L1, L2, and L3 through the phase-shift capacitors 106, 107 and 108, respectively connected in series therewith. The ends of the stator windings 103, 104 and 105 are connected by controllable gating devices, such as the triacs 109, 110 and 111, which are connected at the common point or junction of the respective winding 103-105 with its series connected capacitor 106-108. These common points are designated X, Y and Z.

The phase firing angles of the triacs 109-111 are simultaneously controlled for effecting conduction and control of the stator windings. This control is effected by means of a controller 113, connected in circuit relation with the thus configured windings. For ease of illustration, the controller 113 is shown connected to only two of the three phases, this connection being from controller 113 over first lead 114 to the gate electrode of the triac 109. Lead 115 from controller 113 is connected to the common point Y between the coil 104 and its series connected capacitor 107, while lead 116 is connected to the common point X between the coil 103 and its series connected capacitor 106. Although not shown, for the other phase pairs, additional leads would be connected from the controller 113, with one lead to the gate electrode of triac 111, another lead to the gate electrode of triac 110, with another lead to the common point Z between coil 105 and its series connected capacitor 108.

The triacs 109-111 may be selectively continuously controlled through the full range of firing angles from zero degrees to 180 degrees for simultaneous control of the currents in one coil of each set relative to the other coil of each set. Thus the range of control takes place between these two extreme situations. At one end, when the triacs are in a non-conducting state with firing angles close to 180 degrees, the winding interconnection circuit is such that the triacs are effectively open circuits, in which event the phases of the first set of stator windings 100, 101 and 102 are connected in a wye configuration connected to the lines L1, L2, and L3 of the power supply, with the phases of the second set of stator windings 103, 104 and 105 connected to form a delta configuration when connected to the power lines L1, L2, and L3 through the phase-shift capacitors 106, 107 and 108, respectively connected in series therewith. In this non-conducting state of triacs 109-111, the currents of the second set of windings 103-105 are in phase leading relation to the currents of the first set of windings 100-102. The phase leading angle is determined by the difference of the interconnection of the winding sets, that is the wye and delta configurations, and the values of the capacitors 106-108 that produce an inequality in the phase and magnitude of the current supplied. The machine having its stator windings thus connected and controlled consumes and produces minimum power and performs very well at lower ends of the torque speed characteristics.

As the firing angles of the triacs 109-111 decrease, the phase difference between the relative currents of the two winding sets shifts, and the magnitude difference decreases until it approaches zero at small firing angles. The triacs 109-111 are controllable through controller 113 into conduction through almost a full cycle. At full conduction, the triacs 109-111 act as shunts, thus bringing the common points X, Y and Z together, at which point, both sets of windings effectively have a similar type of connection, that is, their phases form two wyes. The magnitude of the currents in the two sets are at a maximum, and the phase shift is at a minimum. The rotor winding e.m.f., current and rotor speed are maximum for given load conditions. At this condition, the machine consumes and produces rated power and performs in accordance with the basic operating characteristics of the motor. Thus by selective control of the firing angles of the triacs 109-111 through the full range of firing angles by means of controller 113, the phase difference between the relative currents of the two winding sets may be smoothly varied to effect continuous control of the speed of the motor over what is a relatively linear, rather large range of speed control.

As with any three phase induction machine, the sets of windings may be interconnected in various ways to achieve different desirable results, such as primary control of the horsepower, speed or torque. FIGS. 14A through 14G illustrate alternative configurations of the windings for a polyphase motor in accordance with the present invention to achieve different operating characteristics.

Figure 14A:
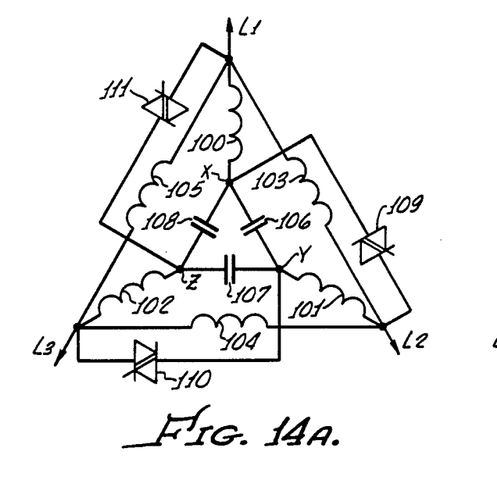
FIGS. 14A through 14G are schematic diagrams showing alternate connection arrangements of the polyphase stator winding in accordance with the present invention interconnected with gating devices in the winding circuit to smoothly effect control of the operating characteristics.

In FIG. 14A the stator windings 100, 101 and 102 are connected through a delta connection of the phase-shift capacitors 108-111, resulting in a modified wye configuration when connected to the lines L1, L2, and L3 of the power supply, with the phases of the second set of stator windings 103, 104 and 105 connected to form a delta configuration when connected to the power lines L1, L2, and L3. The triacs 109-111 are connected between the power line connections L1, L2, and L3 and the common points, designated X, Y and Z of the first set.

Figure 14B:
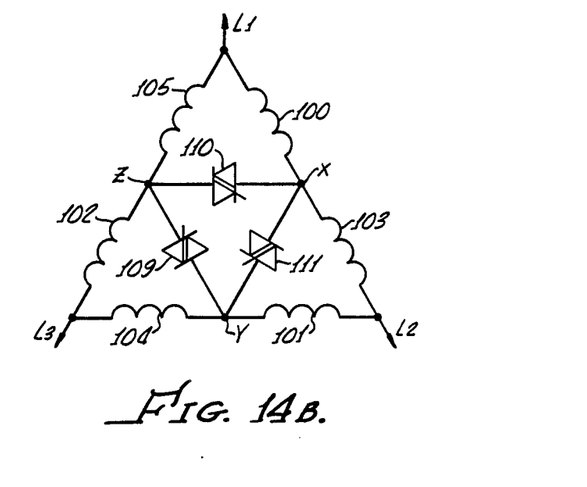
Figure 14C:
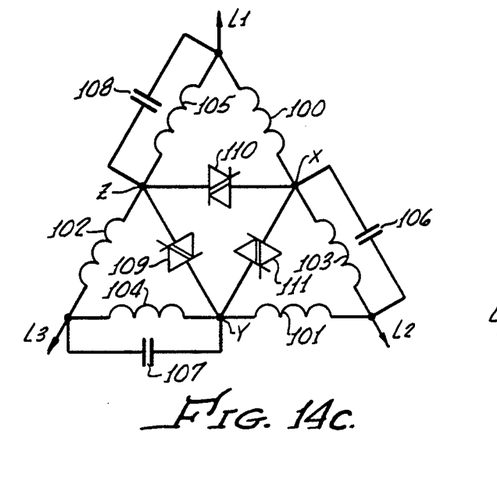

FIG. 14B illustrates an alternate stator winding connection in which each coil of one set of windings 100-102 is connected in series with a like coil of the second set of windings 103-105 to form a delta configuration with the common nodes or points X, Y and Z intermediate the series connected coils being interconnected with triacs 109-111. FIG. 14C shows still another winding interconnection arrangement similar to FIG. 14B, in which the phase-shift capacitors 106-108 are connected in parallel with the second set of windings 103-105, respectively.

Figure 14D:
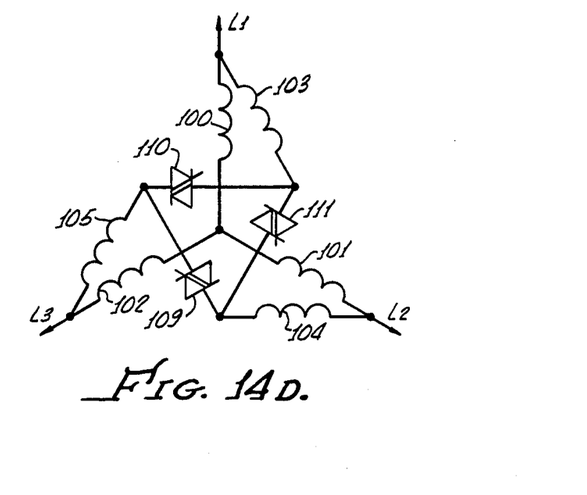

FIG. 14D shows still another winding interconnection arrangement in which one set of windings 100-102 are connected in wye configuration to the power lines L1, L2, and L3, with the first ends of the second set of windings 103-105 connected to the power lines, with the other ends thereof connected to the common nodes of a delta connection of the triacs 109-111.

Figure 14E:
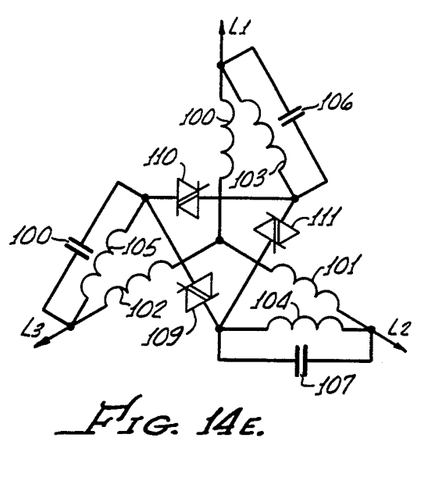

In FIG. 14E, the winding interconnection of the sets of windings 100-102 and 103-105 and the triacs 109-111 are identical to the interconnections of FIG. 14D with phase-shift capacitors 106-108 connected in parallel with the second set of windings 103-105, respectively.

Figure 14F:
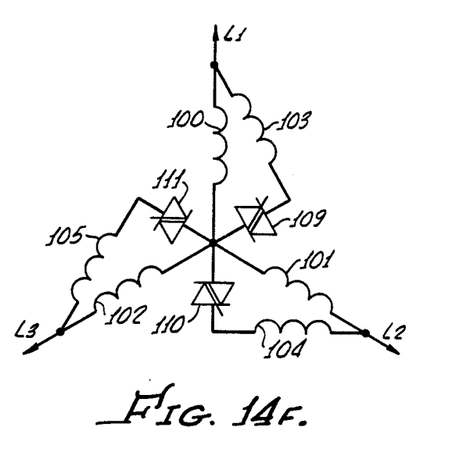

The winding interconnections of FIG. 14F are similar to FIG. 14D. In this arrangement, however, the second set of windings 103-105 are connected in series with the triacs 109-111, and the thus connected series arrangements are connected in parallel with the first set of windings 100-102, with the combined parallel sets thus formed connected in a wye configuration to the power lines L1, L2, and L3.

Figure 14G:
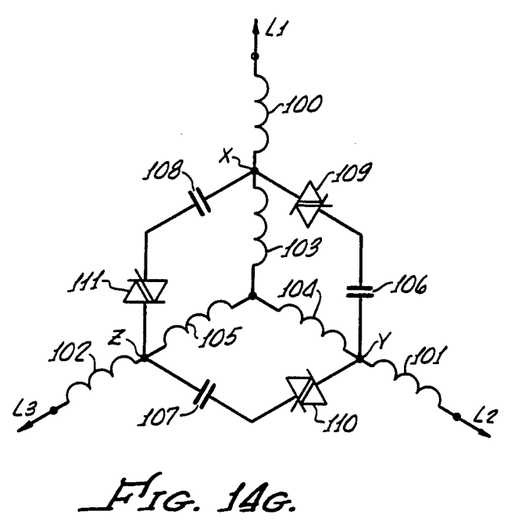

FIG. 14G shows an interconnection arrangement in which like coils of the two sets of windings 100-102 and 103-105 are connected in series and interconnected to form a wye configuration with each of the capacitors 106-108 connected in series with one of the triacs 109-111, with the thus series connected components connected between the common points X, Y and Z.

Each of the winding interconnection arrangements depicted in FIGS. 14A through 14G may be suitably controlled as heretofore described in connection with the winding interconnection arrangement of FIG. 13, that is the firing angles of the triacs 109-111 may be controlled to affect the relative current phase and magnitude relationships to smoothly control the speed of the motor.

Figure 15A:
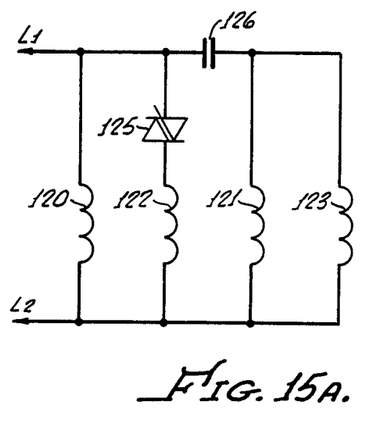
FIGS. 15A through 15E are schematic diagrams showing alternate arrangements for interconnection of the stator windings sets of a single phase machine utilizing the rotor winding in accordance with the present invention interconnected with other devices in the winding circuit to smoothly effect control of the operating characteristics.

FIGS. 15A through 15E depict winding interconnection arrangements for single phase motors constructed in accordance with the teachings of the present invention. In such motors, there are two sets of windings, one set being designated 120, 121, and the second set being designated 122, 123. The power lines are designated L1 and L2. In FIG. 15A coil 120 of the first winding set is coupled between the power lines, with the first coil 122 of the second winding set being coupled in series with a triac 125, and the thus connected series circuit being connected in parallel with coil 120. The second coils 121 and 123 of the first and second set of windings are coupled in parallel, with the parallel circuit connected in series with phase-shift capacitor 126 across the power lines. In this configuration, the first coils 120 and 122 are the main windings of both sets with the coils 121 and 123 comprising the auxiliary windings of both sets. Selective continuous control of the firing angle of the triac 125 in the main winding 122 alters the relative phase of the currents between the coils of the main set of windings resulting in the ability to smoothly vary the speed of the motor.

Figure 15B:
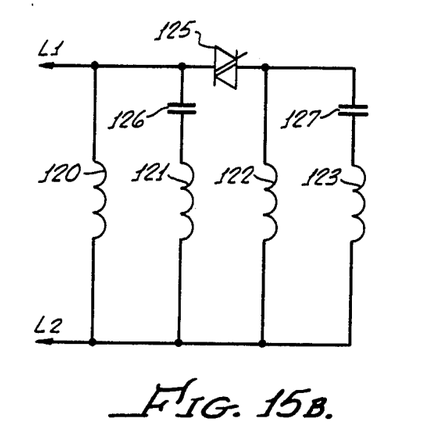

FIG. 15B illustrates another winding interconnection arrangement for the single phase motor, wherein main coil 120 of the first winding set is coupled in parallel with the series connected auxiliary coil 121 of the first set and capacitor 126. The second main coil 122 of the second winding set is coupled in parallel with the series connected auxiliary coil 123 of the second set and a second capacitor 127, and powered through triac 125 with the thus connected parallel sets of coils further connected between the power lines.

Figure 15C:
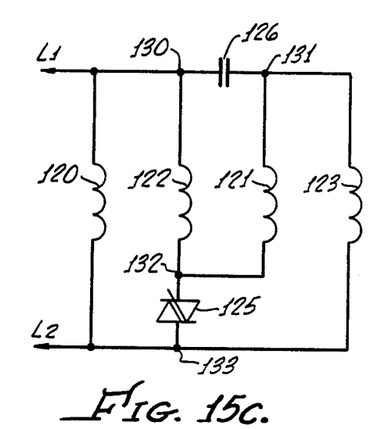
Figure 15D:
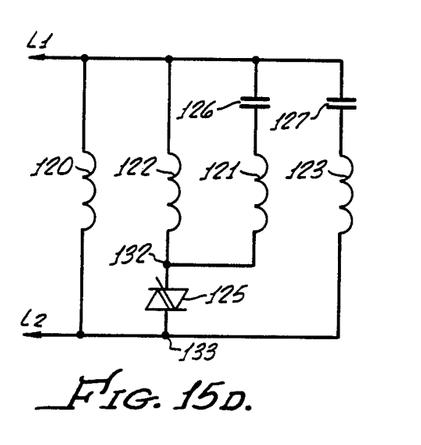

FIG. 15C illustrates another winding interconnection arrangement for the single phase motor, wherein a main coil 120 of the first winding set is connected across lines L1, L2. A second main coil 122 is connected through series connected triac 125 across lines L1,L2. One end 130 of main coil 122 is connected through capacitor 126 to one end or node 131 of an auxiliary coil 121, the other end of which is connected to the other end or node 132 of main coil 122. The second auxiliary coil 123 is coupled from node 131 to line L2. FIG. 15D is a modified arrangement of the winding interconnection diagram of FIG. 15C, in which the salient differences are the inclusion of separate phase shift capacitors 126 and 127 in series with each of the auxiliary coils 121 and 123, respectively.

Figure 15E:
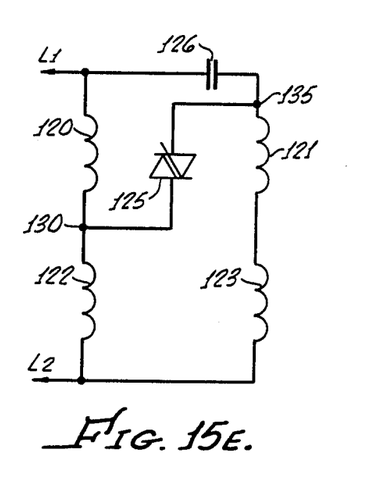

Still another winding interconnection arrangement for a single phase induction motor is shown in FIG. 15E, in which main coils 120 and 122 are connected in series across the power lines L1, L2. Coil 123, coil 121 and capacitor 126 are likewise connected in series across the power lines, with triac 125 connected from the junction node 135 intermediate coil 121 and capacitor 126 to the junction node 130 intermediate main coils 120 and 122. This particular arrangement, however, is not a preferred method due to some loss in energy efficiency.

In all of the winding interconnection arrangements of FIGS. 13, 14A-14G and 15A-15E, it is to be understood that the sets of windings include coil arrangements of separated, independently fed, groups of windings, per phase, and a compound short-circuit rotor winding loop member having open loop portions, as hereinabove described. In accordance with the invention, by separately controlling one group of stator windings relative to the other, variable distribution, or variable pattern traveling flux fields are established for predictable, controllable interaction with open loop portions of the compound short-circuited rotor winding loop member to effect, in an induction machine in accordance with the invention, a very large range of operation of the machine, with substantial stability, even at low speeds. Such a machine is provided with revolving compound magnetic stator fields of variable flux distribution, the components of which are induced by the independently fed sets of windings, operating in interaction with the rotor winding isolated loop member, the loop portions or elements of which link components of this compound field, thus resulting in supplying two independently controllable fluxes in one common loop. Furthermore, by selective winding interconnection as herein described, one or more operating parameters may be primarily controlled to operate the machine, with appropriate selection of capacitive coupling and linear or nonlinear controllable devices in circuit relation with the windings. It is also to be understood that the stator winding arrangements may take any convenient form in addition to those herein illustrated, including asymmetrical arrangements of both sets, variable span arrangements, alternating span arrangements, or the like, in single phase or polyphase configurations.

It is to be further understood, that although the loop member 50 has been depicted as having elements 50a-50d with electrical connections on one end mutually perpendicular to the electrical connections on the other end, other end interconnections are within the scope of the invention. For example, by reference to FIG. 7, for a particular stator winding arrangement, end connections 50e and 50f may cross in the form of an "X", rather than being parallel as shown. Moreover, other open loop portions may be connected, preferably in sets, to the same end connections of the loop member, with the thus added set of open loop portions physically arranged in spatial relation to another set of winding coils, or another phase of the winding sets on the stator.

On the rotor of an induction machine, such cooperating open loop portions would be preferably diametrically opposed, or equi-angularly disposed and generally in spatial alignment with a cooperating one of the phase coils.

While there have been shown and described preferred embodiments, it is to be understood that various other adaptations and modifications may be made within the spirit and scope of the invention.

What is claimed is:

1. In an alternating current asynchronous induction machine, the combination comprising:
   housing means:
   stator means within said housing means and having at least two phase sets of independently fed stator winding means, with each phase set including at least one phase coil;
   armature means mounted within said housing means for movement relative to said stator means with an air gap between the periphery of said armature means and the adjacent part of said stator means;
   armature winding means on said armature means including at least one short-circuited loop member including open loop portions arranged in generally spatially aligned relation with said at least one coil of both of said sets; and
   means for applying alternating current power to said phase sets including
   (a) means for applying alternating current power to said at least one phase coil of one of said phase sets, and
   (b) means for controlling the application of alternating current power to the other said at least one phase coil for enabling control of at least one of
      (i) the current therein relative to the other said at least one phase coil and
      (ii) the phase shift of the current therein relative to the other said at least one phase coil for controlling the operating parameters of said machine.

2. The combination according to claim 1 wherein said armature means is a rotor in an induction machine.

3. The combination according to claim 2 wherein said armature winding means includes at least one continuous loop member having at least two open loop portions.

4. The combination according to claim 1 wherein said induction machine is a three phase machine having:
   at least two sets of three phase coils associated in pairs;
   at least one loop member on said armature means, said loop member having at least two open loop portions; and
   wherein said means for applying alternating current power to said phase sets includes means for applying three phase power, and said means for controlling the application of alternating current power includes control device means in circuit relation with at least one of said sets.

5. The combination according to claim 1 wherein said induction machine is a single phase machine having:
   at least two sets of phase coils associated in pairs;
   at least one loop member on said armature means having at least two open loop portions; and
   wherein said means for controlling the application of alternating current power to said at least one phase coil includes control device means in circuit relation with said at least one phase coil.

6. The combination according to claim 1 wherein said means for controlling the application of alternating current power to said at least one phase coil includes control device means in circuit relation with said at least one phase coil.

7. The combination according to claim 6 wherein said control device means includes at least one silicon controlled rectifier.

8. The combination according to claim 6 wherein said control device means includes at least one triac.

9. The combination according to claim 4 wherein said means for controlling the application of alternating current power to said at least one phase coil includes controllable semiconductor device means.

10. The combination according to claim 5 wherein said means for selectively controlling the application of alternating current power to said at least one phase oil includes controllable semiconductor device means in circuit relation with said at least one phase coil.

11. The combination according to claim 4 wherein said control device means includes at least one silicon controlled rectifier.

12. The combination according to claim 5 wherein said control device means includes at least one silicon controlled rectifier.

13. The combination according to claim 5 wherein said control device means includes at least one of a triac and a silicon-controlled rectifier.

14. In a three-phase asynchronous alternating current induction machine, the combination comprising:
   housing means;
   stator means within said housing means and having at least two independently fed sets of three phase stator winding means, each of said sets having associated pairs of phase coils;
   rotor means mounted within said housing means for rotation relative to said stator means with an air gap between the periphery of said rotor means and the adjacent part of said stator means;
   rotor winding means on said rotor means including at least one short-circuited loop member having at least two open loop portions arranged in generally aligned spatial relation to one phase coil of both of said sets of stator winding means;
   means for applying three-phase alternating current power to said phase coils; and
   means in circuit relation with said stator winding means and said means for applying power for selectively varying the application of power to one of said sets relative to the other of said sets for enabling control of at least one of
      (a) the phase current in said one of said sets relative to the other of said sets and
      (b) the phase shift of the phase current in said one of said sets relative to the other of said sets for controlling the operating parameters of said machine.

15. The combination according to claim 14 wherein said motor includes at least three generally identically configured loop members, with each of said loop members generally spatially aligned with an associated pair of coils of both of said sets of stator windings.

16. The combination according to claim 14 wherein each of said loop member includes a plurality of conductor elements connected and axially disposed to form said open loop portions so that each loop portion faces a stator pole of opposite polarity whereby the loop conductor elements link the fluxes of stator poles carrying coils of different sets.

17. The combination according to claim 15 wherein said rotor means includes slot means extending generally transverse to the direction of rotation of said rotor means, and wherein each of said loop members is a single continuous loop conductor with said loop members successively arranged in said slot means with each of said loop members shifted relative to another along said air gap.

18. In an asynchronous alternating current induction machine, the combination comprising:
  housing means;
  stator means in said housing for forming at least one pair of primary poles, and a spaced pair of secondary poles intermediate said primary poles;
  stator winding means on said stator means including at least two independently fed sets of inductively uncoupled phase coils carried by said primary poles;
  armature means movably mounted relative to said stator means within said housing means with an air gap between said stator means and said armature means;
  slot means on said armature means extending in a direction generally transverse to the direction of relative movement between said stator means and said armature means;
  armature winding means on said armature means including at least one conductor loop member having at least two open loop portions positioned on said armature means within said slot means with said at least two open loop portions being physically arranged in facing relation with at least two of said poles; and
  means for applying alternating current power to said sets including means for selectively varying the application of power to one of said sets relative to the other for enabling control of at least one of
    (a) the current in said one of said sets relative to the other of said sets and
    (b) the phase shift of the current in said one of said sets relative to the other of said sets for controlling the operating parameters of said machine.

19. The combination according to claim 18 wherein said armature means is a rotor in an induction machine.

20. The combination according to claim 19 wherein said loop member is formed from a continuous short-circuited conductor member.

21. The combination according to claim 18 wherein said induction machine is a three phase machine wherein said stator winding means includes at least two sets of three phase coils associated in pairs, said at least one loop member is a short-circuited member having at least two equiangularly disposed open loop portions; and wherein said means for selectively varying the application of power includes control device means in circuit relation with at least one of said sets.

22. The combination according to claim 21 wherein said machine includes at least three generally identically configured loop members, with each of said loop members generally spatially aligned with both of said sets of stator windings.

23. The combination according to claim 18 wherein said induction machine is a single phase machine wherein said stator winding means includes at least two sets of coils associated in pairs, said at least one loop member is a short-circuited member having at least two equiangularly disposed open loop portions, and wherein said means for selectively varying the application of power includes control device means in circuit relation with at least one of said sets.

24. The combination according to claim 23 wherein said control device means includes at least one silicon controlled rectifier.

25. The combination according to claim 23 wherein said control device means includes at least one triac.

26. In an asynchronous alternating current induction machine, the combination comprising:
  stator means having first and second stator winding means;
  armature means mounted for movement relative to said stator means;
  winding means on said armature means including at least one loop member having at least two open loop portions arranged in generally spatially aligned relation with at least some of said first and second stator winding means; and
  means for independently applying power to said first and second stator winding means for selectively varying the application of power to one of said first and second winding means relative to the other for controlling the operating speed parameters of said machine.

27. The combination according to claim 26 wherein said means for independently applying power includes controllable device means in circuit relation with one of said first and second stator winding means.

28. The combination according to claim 27 wherein said controllable device means includes controllable rectifier means.

29. The combination according to claim 26 wherein said first stator winding means includes a first set of stator coils connectable to a power source.

30. The combination according to claim 29 wherein said controllable device means is in circuit relation with said second set of stator winding means and the power source.

31. The combination according to claim 30 wherein said controllable device means is a controllable semiconductor having a gate electrode.

32. The combination according to claim 26 wherein said loop member is formed as a continuous short-circuited loop member and said open loop portions are in oppositely disposed relation.

33. The combination according to claim 26 wherein said induction machine is a single phase machine, and said first and second stator winding means includes first and second sets of coils, each of said sets including a main coil and an auxiliary coil.

34. The combination according to claim 33 wherein said means for independently applying power includes controllable device means in circuit relation with at least one coil of said main and auxiliary coils.

35. The combination according to claim 33 wherein each of said main winding coils is associated with an auxiliary winding coil, and said controllable device means is in circuit relation with at least one main winding coil and its associated auxiliary winding coil.

36. The combination according to claim 33 wherein said means for appying power further includes capacitive means in circuit relation with at least one of said auxiliary winding coils.

37. The combination according to claim 26 wherein said means for independently applying power includes controllable device means in circuit relation with one of said first and second sets of stator winding means for selectively controlling one of the magnitude of the current therein and the phase shift of the current therein relative to the other of said sets of stator winding means.

38. The combination according to claim 1 wherein said short-circuited loop member includes a plurality of conductors in short circuited relation, said armature means includes slots therein and said armature winding means includes a plurality of said short-circuited loop members having certain conductors thereof arranged in said slots with each of said loop members shifted relative to another along said air gap by one slot.

39. The combination according to claim 38 wherein each slot carries at least two conductors of at least two loop members.

40. The combination according to claim 18 wherein said short-circuited loop member includes a plurality of conductors in short circuited relation, said armature means includes slots therein and said armature winding means includes a plurality of said short-circuited loop members having certain conductors thereof arranged in said slots with each of said loop members shifted relative to another along said air gap by one slot.

41. The combination according to claim 40 wherein each slot carries at least two conductors of at least two loop members.

42. The combination according to claim 26 wherein said short-circuited loop member includes a plurality of conductors in short circuited relation, said armature means includes slots therein and said armature winding means includes a plurality of said short-circuited loop members having certain conductors thereof arranged in said slots with each of said loop members shifted relative to another along said air gap by one slot.

43. The combination according to claim 42 wherein each slot carries at least two conductors of at least two loop members.

* * * * *